(12) United States Patent
Nasser-Moghaddassi et al.

(10) Patent No.: US 6,675,955 B2
(45) Date of Patent: Jan. 13, 2004

(54) SELF TUNING VIBRATORY CONTROL MEANS

(75) Inventors: Majid Nasser-Moghaddassi, Simpsonville, SC (US); James Richard Asbury, Simpsonville, SC (US); Jefferson Calvin Mabry, Jr., Spartanburg, SC (US); Dale Mark Cherney, Howards Grove, WI (US)

(73) Assignee: Hayssen, Inc., Duncan, SC (US)

( * ) Notice: Subject to any disclaimer, the term of this patent is extended or adjusted under 35 U.S.C. 154(b) by 47 days.

(21) Appl. No.: 10/016,404

(22) Filed: Dec. 10, 2001

(65) Prior Publication Data

US 2002/0157925 A1 Oct. 31, 2002

Related U.S. Application Data

(60) Provisional application No. 60/287,183, filed on Apr. 27, 2001.

(51) Int. Cl.⁷ .................................. B65G 27/24
(52) U.S. Cl. ........................ 198/769; 198/766
(58) Field of Search .............................. 198/769, 766, 198/761, 760

(56) References Cited

U.S. PATENT DOCUMENTS

| | | | |
|---|---|---|---|
| 3,435,995 A | | 4/1969 | Garnett |
| 4,260,051 A | * | 4/1981 | Burghart ............... 198/760 |
| 4,315,817 A | * | 2/1982 | Popper ................ 198/766 |
| 4,350,243 A | | 9/1982 | Weyandt |
| 4,496,884 A | * | 1/1985 | Hamer et al. ......... 198/763 |
| 5,074,403 A | * | 12/1991 | Myhre ................ 198/769 |
| 5,127,512 A | * | 7/1992 | Frolich et al. .......... 198/766 |
| 5,906,254 A | * | 5/1999 | Schmidt et al. ......... 188/378 |
| 5,931,285 A | * | 8/1999 | Madsen et al. .......... 198/762 |

FOREIGN PATENT DOCUMENTS

WO    WO 00/26124    5/2000

* cited by examiner

Primary Examiner—Douglas Hess
(74) Attorney, Agent, or Firm—Alston & Bird LLP

(57) ABSTRACT

A product delivery system and method are provided including an electromechanical vibratory conveyor which has a product conveying member, a vibrator for vibrating the product conveyor and a control system for controlling electronically the vibration of the product conveying member both statically and dynamically to optimize performance both with and without product on the product conveying member. The vibration of the product conveying member is tuned both statically and dynamically with a coarse tuning followed by a fine tuning. An improved pulse width modulation drive circuit for the vibrator includes vibrating frequency and amplitude varying devices for adjusting the frequency and amplitude of the vibrator for increased efficiency, optimized performance and reduction in energy consumption. Several redundant safety devices to safeguard the switching devices and the vibrator are also provided.

17 Claims, 16 Drawing Sheets

Drive Signal

SELF TUNING VIBRATORY CONTROL MEANS

CROSS-REFERENCE TO RELATED APPLICATIONS

This application is based on U.S. Provisional Application No. 60/287,183 filed Apr. 27, 2001, which is incorporated herein in its entirety by reference.

FIELD OF THE INVENTION

The present invention relates to conveyors and more particularly vibratory conveyors used to move products between two locations or points.

BACKGROUND OF THE INVENTION

Vibratory conveyors are the common and preferred method of transferring product from a collection point to an individual weigh head in a scale system. In order to understand the modifications made to the conventional systems to significantly improve the performance of these systems by the present invention, a complete understanding of the operation of these vibrators and of the shortfalls of existing systems is believed necessary. Therefore, a detailed description, with reference to the drawings will be provided.

A cross sectional view of a typical linear feeder vibrator 50 used to transfer product from a source to a scale head is illustrated in FIG. 1. The vibrator 50 consists of a magnetic coil 52 which is wound on a core 54. The vibrator 50 includes a product conveying member or pan 56, which holds the product for transfer, and is mounted to the vibrator frame 58 by a front flexture 60 and a rear flexture 62. The flexures 60, 62 act as support members as well as springs to return the pan 56 to the rest position after it has been deflected by the magnetic force from the coil 52. In order to achieve maximum efficiency, the pan 56 is attached to the vibrator base 58 using the flexures 62 and 60 and mounting bolts 64. The assembly 50 is mounted to the main frame using springs 68 to isolate the vibration of the vibrator assembly 50 from the main frame, which is not specifically shown.

These flexures 60, 62 are generally flat sheets with mounting holes drilled in the ends and are made from fiberglass and can be obtained in varying thickness. The thickness generally determines the stiffness or spring constant, with the thicker flexures being more rigid than the thinner flexures. The thinner the flexure, the greater the amplitude of displacement at a lower frequency and vice versa. The amplitude must be kept within a specific range for each mechanical set-up. For fixed amount of energy applied to the core, if the amplitude is kept too small by using flexures which are too thick, the product will not flow through the pan 56 at the desired rate. If the amplitude is too high because of using flexures which are too thin, the armature plate 66 can come into contact with the winding core 54, thus resulting in excessive noise and interruptions in the flow of product in the pan 56.

The motion imparted to the product in the pan 56 is due to two components of the design.

1) The first component is imparted by the magnetic field influenced by the ampere turns in the core 54. The vibrator displacement is measured from a rest position to the point at which the magnetic force from the coil 52 pulls the armature plate 66 as close as possible to the coil core 54 without contact. The motion traveled by the rear of the pan is back and down because of the mounting orientation of the rear flexture 62. The coil force imparts potential energy to the flexures 60 and 62 during this movement.

2) The second component of this motion is the release of the potential energy stored in the flexures 60 and 62 when the magnetic field of the coil 52 collapses. At this time, the rear of the pan 56 is moved up and forward thus launching the product in the pan in a similar upward and forward motion.

To check the amplitude of the vibration (pan displacement), an amplitude indicator 80 is attached to the pan 56. Further detail of the indicator is shown in FIG. 2. This is a very simple device that takes the form of a stick-on label in the form of a "V". The "V" consists of a left side 72 and a right side 74. The distance across the "V" is indicated by the amplitude numbers 76 and 78, These numbers have the even millimeter numbers 76 shown on the right side and the odd millimeter numbers 78 shown on the left side of the "V".

An observer looking at the "V" while the pan 56 is vibrating can see a peak as an optical illusion when the side lines cross each other as illustrated in FIG. 2a. This peak indicates the amplitude of the pan vibration and the numeric value in millimeters can be read during the testing process as the vibrator is energized. This simple amplitude indicator has been used to tune these vibrators for years.

The tuning procedure heretofore utilized involves adjusting the spring constant of the flexures by changing the flexure thickness to provide a maximum amount of deflection at a given frequency of 50 or 60 Hz (AC power frequency) with a fixed amount of energy applied to the coil 52. More specifically, this traditional tuning process involves:

1) Inputting a fixed amount of power into the coil;
2) Observing the amplitude indicator "V";
3) If the movement detected by the amplitude indicator is less than the desired value, the thickness of the flexures is decreased;
4) If the movement detected by the amplitude indicator is greater than the desired value, the thickness of the flexures is increased; and
5) Often several flexures piled on top of each other are used to provide the desired spring constant and therefore to obtain the desired amplitude. It is readily apparent that this traditional tuning process can only be performed with no product on the pan 56.

The vibrator illustrated in FIG. 1 typically operates on ½ wave AC supply. In operation, when the coil 52 is energized with a supply current, a magnetic field is established at the end of the winding core 54. This magnetic field attracts the armature plate 66 which pulls the vibrator pan 56 back. The distance pulled will depend on the following parameters:

1) The power applied to the coil 52;
2) The design of the solenoid consisting of the coil 52 and the winding core 54;
3) The proximity of the solenoid core 54 to the armature 66;
4) The stiffness of the flexures 62 and 60; and
5) The mass of the pan 56 and the mounting hardware 70.

The return is accomplished with the energy stored in the deflection of the flexures 60 and 62. Because the vibrator is driven by a half wave rectified sine wave, as illustrated in FIG. 3a, this, in theory, means that the pan 56 is moving back for one half of the total cycle of the mains and forward for the remaining half cycle. In fact, this is not true for several reasons.

Looking at FIG. 3a, the half wave rectified sine wave is shown driving the vibrator coil 52. This is typically a sine wave, which is derived from the line voltage, which means it has a frequency component of either 50 or 60 Hz. At 50 Hz, the cycle to go forward and back takes 20 ms and for 60 Hz, the period is 16.67 ms. Therefore, the tuning of flexure thickness is generally different for a 50 Hz voltage source than for a 60 Hz source.

FIG. 3b generally illustrates the displacement as a function of excitation voltage. It should be noted that at time=0, the displacement is 0. When the voltage is applied, there is no movement for a period of time. This is due to the low initial voltage level, as well as the relatively large gap between the armature plate 66 and the coil core 54. Once the voltage is sufficient to cause a magnetic flux large enough to begin attracting the armature 66, the armature advances relatively rapidly, as indicated by the exponential form of the displacement curve. This displacement continues to increase so long as the voltage is present, since the voltage required to hold the armature 66 decreases as the gap decreases. If the armature plate 66 was allowed to touch the coil frame 54, it would be found that the power required in the coil 52 to maintain this condition would be approximately ⅓ of the power required to bring the armature plate 66 into contact with the coil core 54.

It should be noted that at this point if a different waveform were used, which would cause more power to enter the coil in less time, the response of this coil 52 could be dramatically improved. This is one of the improvements which is provided by this invention.

When the voltage decreases to zero, there is still a force being applied to the armature 66 due in part to the residual magnetism in the core 54, but more importantly, the current in the coil 52 wants to keep flowing. In an inductor such as this coil 52, the current lags the voltage waveform by approximately 90 electrical degrees, which means that when the voltage waveform is at zero, the current is approximately at the maximum, and if the source of the energy is interrupted, the current does not decay immediately.

In FIG. 4a, a relay contact CRX 10 is shown energizing the coil 52. When the contact closes and the half wave rectifier diode 12 is forward biased, it allows current to pass through the contacts of CRX 10, through the diode 12 and into the vibrator coil 52. At this time, the flux begins to build as a result of the current in the coil 52, and the attraction of the armature plate 66 begins.

This is shown in the time frame of 0 to T1 in FIG. 3b. Keep in mind that the current lags the voltage waveform by 90 electrical degrees, and while the voltage appears to be zero at T1, the current continues to flow while the gap is relatively small, and as a result, the movement back to the rest position does not begin until T2. This approximate 90-degree lag has been a problem for many years when driving these vibrators. Looking again at FIG. 4a, if the relay contact CRX 10 were allowed to open at T1, even though there is no voltage present, the current which lags the voltage waveform by 90 electrical degrees is still flowing and if a relay contact is observed in this condition, the result is a bright blue flash when the contact opens. Even though the relay contacts have generally been replaced with solid state devices, this phenomenon has been the cause of failure for many switches both mechanical as well as solid state.

In order to attempt to redirect this destructive current, the diode 14 in FIG. 4b has been added to many DC circuits. The diode 14 causes the current flowing in the coil 52 to be redirected back into the coil when the contact CRX 10 is opened. Any other time, the diode 14 is back biased by the source voltage.

While this scheme improves the reliability of the switching elements CRX 10, there is also a significant disadvantage in that the flux field of the coil 52 is maintained for a long period of time until the current is dissipated in the coil 52. This discharge time is governed by the physical attributes of the coil 52 by the time constant $I=V/R(1-e^{-(Rt/L)})$. The problem with using this diode 14 in this application is that it results in significantly less retract time and produces limited return motion as a result. For this reason, the diode 14 is commonly called a flywheel or reset diode in the industry.

The movement back in the range of time T2 to T4 is due to the kinetic energy stored in the flexures 60 and 62. It should be noted that if the flywheel diode 14 were added to the circuit, the times T2 and T4 of FIG. 3a would be extended out in time which would significantly shorten the return time available. This is generally undesirable, and this invention addresses this discharge problem by allowing the energy stored in the system to be recycled back to the supply while producing a desirable vibration and also precisely altering the ON and OFF times to effectively modify both frequency and duty cycle of the power to the vibrator coil 52 to obtain the optimum operation.

The pan 56 continues its return travel from T2 until the force exerted by the coil flux is equal to the kinetic energy of the moving pan 56 attempting to get back to the rest position at point T4. It is important to note that typically this will not be the rest position, but may in fact be either prior to or after the 0 position depending on system parameters including the tuning parameters. When the inertia matches the force available to pull the armature plate 66 back, the motion reverses and begins to come back to the retracted position to start the next cycle.

The input voltage of FIG. 3a is depicted as a half wave rectified sine wave. While other waveforms are possible, most vibrators are driven directly from the AC line power source. Power applied is generally regulated by either adjusting the amplitude of the voltage or using a phase shift circuit to eliminate a segment of the waveform. By regulating the voltage, this regulates the power applied to the coil 52, and thus effects the amplitude of vibration.

To move the product, the motion can be described in regard to FIGS. 5a and 5b. This description is based on an ideal set of conditions with respect to both product and hardware. Obviously, most cases are not ideal. The best place to start is at position 2 of the displacement drawing, FIG. 5a. At this point, one piece of product 18 is shown moving from left to right on the surface of the vibrator pan floor 16 as illustrated in FIG. 5b. At point 2, the pan is in its downward and retracted position with the coil flux still pulling the pan 56 back. As the pan 56 begins its return travel at point 2, the product 18 initially remains on the pan floor 16 and is imparted a forward motion by the pan 56. As the pan 56 moves in the upward arc, there is a point at which the product 18 is launched into the air and away from the pan floor 16. The inertia of the product carries it in an upward and forward motion. While the product 18 is still above the pan floor 16 at point 3, the coil again begins attracting the pan 56 back to the retracted condition. In the ideal situation, the product 18 is in the air away from the pan floor 16 until the pan is again in the retracted position 4. At this time, the product 18 contacts the pan floor 16 for acceleration in the next cycle.

In order to better understand the actual operation of the circuit improvements, it is necessary to look at several different methods of utilizing a DC voltage to drive a vibrator which was traditionally running on an AC line voltage at a frequency of 50 or 60 Hz. The DC drive allows the frequency to be determined by the controller rather than by the power company and eliminates most of the tuning problems which were traditionally a problem when attempting to achieve resonance at 50 or 60 Hz. In addition, it provides significant advantages in efficiency and linearity over previous drive methods. The simplest DC drive configuration is illustrated in FIGS. 10a and 10b.

The desire is to have the product actually leave the surface of the pan 56 during the retract motion. While the product is still above the pan, the pan 56 begins its reverse travel which keeps the product from being retracted with the pan on the retract cycle.

Vibrator Principles of Operation

With reference to the FIG. 10a, we begin the discussion assuming the switch 120 is open and there is no stored field energy, after the switch 120 is closed, the sequence of events falls into four distinct phases:

1. After the switch 120 is closed, the current rises exponentially. If $L_1$ is the inductance of the coil 52 for the initial position of the armature 66, the initial rate of rise of current is given by $E/L_1$. The electrical energy from the source is partly dissipated in $i^2R$ loss in the magnetic coil and the rest of it is converted into stored energy in the magnetic field. During this period, the armature 66 experiences an attractive force but the various mechanical restraints prevent it from moving. It is not unusual to find that the steady-state value of coil current has almost been reached before the armature 66 starts to move due to the sum of mechanical forces of the system.
2. At some appropriate value of current, the armature 66 begins to move. This occurs when the force of attraction $f_E$ exceeds the mechanical force $f_M$. During the motion of the armature 66, there are many changes of energy in the system. On the mechanical side, energy is required to stretch the flexures, drive the external load and supply the kinetic energy required by the moving parts. At the same time, the air gap (the gap between the armature 66 and the core 54) is being reduced with consequent increase in the inductance of the arrangement. This causes a reaction in the electrical system in the form of induced EMF. In other words, the system operates as a generator. This EMF tends to reduce the coil current and permits the conversion of electrical energy; i.e. it is the reaction to the action.
3. If the applied power stays on long enough the armature 66 can not continue to move indefinitely, but instead, it hits a mechanical end stop. This causes the kinetic energy of the system to be dissipated as other forms of energy including audible noise, deformation of magnetic poles and vibration (this phenomena is called hammering). This happens when the system inductance becomes constant and there is no back EMF to oppose the current flow in the coil 52. The current in the coil 52 reaches a steady value of E/R and the power dissipation reaches its maximum of $i^2R$. In the scale application, however, the time duration of the applied voltage reaches an abrupt end before the armature 66 reaches its mechanical stop and giving time to the armature 66 to return to its original position making it ready for the next pulse. For this reason and to protect the coil 52, it is recommended not to allow the vibrators to hammer.
4. If the applied pulse continues and becomes a DC voltage source to the coil 52, there will be no further motion of the system, the inductance now becomes constant at a new higher value $L_2$. The current increases exponentially to a value V/R. It should be noted that the rate of rise is less than the initial rate of rise since the inductance is now much higher.

It is a common misconception to assume that driving a vibrator is like driving a simple inductor with no moving parts. However, the vibrator acts as a motor with an armature 66 that moves in and out to produce the required vibration. When the vibrator coil 52 is energized, the armature 66 is attracted to the core 54 and becomes magnetized. When the power is removed from the coil 52, the armature 66 is pulled away from the core 54 by the flexures 60, 62 (springs). As the armature 66 moves away from the core 54, it gives the energy stored in it, back to the supply.

The definition for an electromagnetic machine is a means which links an electrical energy system to another energy system by providing a reversal means of energy flow in its magnetic field. The magnetic field is therefore the coupling between the two systems and it is the mutual link. The energy transferred from one system to another is temporarily stored in the field and then released to the other system.

Usually the energy system coupled to the electrical system is a mechanical one; the function of a motor is to transfer electrical energy to mechanical energy at the same time a generator converts mechanical energy into electrical energy.

There have been many drive systems designed to actually energize the coils 52. Early systems were driven with relays as illustrated in FIGS. 4A and 4B. As solid state devices replaced the electromechanical devices, the drives were driven with SCRs, TRIACs, or other solid state combinations.

In order to control the power levels applied to the vibrators, mechanical means were used to control a variable transformer. One such device is illustrated in FIG. 6. In this arrangement, an AC line voltage is applied between L1 and L2. The Variac 98 acts as a dual winding transformer with a sliding tap 96. The device functions much like a potentiometer that effects the turns ratio of the transformer and thus the voltage applied to the vibrator coil 52. Line L2 is switched ON or OFF in the conventional manner with an electromechanical contact or solid state AC switch. The position of the tap 96 can be varied by a device, such as a bi-directional synchronous motor 90 driving a gearbox 92. The output shaft of the gearbox is linked to a mechanical connector which generally consists of a linkage which is not tightly coupled to the sliding tap 96. This allows several corrections of the motor in one direction to actually move the sliding tap 96 from an increasing voltage position to a decreasing voltage position. The bi-directional motor 90 is run for a predetermined time to cause an incremental correction. This control circuitry is well known in the industry and will not be further discussed here. Using this hardware, the power to the vibrator coil 52 can be adjusted by changing the voltage applied which in turn controls the amplitude of the vibration.

FIG. 7 shows another method of controlling power to the coil 52. This involves a solid state phase shift module which feeds a portion of a whole half cycle of the AC waveform to the coil 52. This technology is well known in the industry and will not be filter discussed here. This is a relatively inexpensive control means, but because of the high dv/dt switching noise is not well accepted in Europe or other developed countries. Therefore, it is seldom used in modem designs.

FIG. 8 shows a pulse width chopped DC configuration to vary the input power to the vibrator. This means has been well known in the industry for years, and will not be discussed here, but the special adaptations of the present invention make this a viable method of precisely controlling a vibrator in a very unique manner.

There are many methods to drive a vibrator coil 52 using Pulse Width Modulation PWM and a DC power source. These methods are listed below:

1. Low side single supply switching;
2. High side single supply switching;
3. High and low sides (two switch topology) single supply;
4. Full bridge four switch single supply; and
5. Half bridge push-pull with differential supply.

The advantage, disadvantage, and a brief description of each method and the operation will be discussed in the following sections to disclose the prior art which existed at the time of the development.

All of the listed methods use a DC supply voltage that can vary in potential. A 160 VDC (full wave rectified 120 VAC) for the single supply and a ±160 VDC for the differential supply drive methods are used here. The solid state switching element is shown as a mechanical switch for simplicity. The actual switch can be a power MOSFET (Metal Oxide Semi Conductor Field Effect Transistor) or an IGBT (Isolated Gate Bipolar Transistor) or similar. Any power transistor will work satisfactory, but the IGBT is generally preferable to the MOSFET for its low cost and higher current and voltage ratings.

Method #1 is illustrated in FIGS. 10a and 10b. This is generally known as Low Side (or Sinking) Single Supply Switching. This is the simplest method to drive the vibrator coils 52. The simplicity is partially based on the fact that the drive uses a single ground-referenced switch 120 to drive the vibrator coil 52. One side of the coil 52 is connected to the positive source voltage 126, and the other side is connected to the switch 120 at node 122. The other side of the switch 120 is connected to the ground reference of the supply 124. A meter V 150 is shown measuring the voltage across the coil (Coil Voltage) FIG. 10b. In this case, when the switch 120 turns ON, according to a drive signal 128, the meter V changes from a reading of 0 volts 131 to +VS 130. The coil voltage remains at 131 until the drive signal transitions from ON to OFF 129. The coil current is shown going from 0 amps 140, increasing exponentially 141 to a maximum current 142 which is approaching the Supply Voltage/Coil DC Resistance limit.

When switch 120 opens and the drive signal goes from ON 128 to OFF 129, A back EMF is generated when the current attempts to keep flowing in the coil 52. This back EMF transitions to a peak voltage 132 which can be several magnitudes higher than the source voltage VS 130. The voltage then exponentially decays to 0 volts at 134. The rate of the exponential decay is dependent on the coil parameters.

If a flywheel diode is not used, the power required to drive the coil 52 is reduced by the opposing back EMF. The voltage stress on the switching element is the sum of the supply voltage and the return energy from the armature 66. This combination produces a high voltage in the order of several magnitudes larger than the supply voltage. This high voltage stress eventually causes the switching element 120 to fail.

Advantages of this method include:
1. Simple drive referenced to ground.
2. Lower power requirement for a given displacement due to the opposing back EMF.
3. Current flowing through the switch flows through the vibrator coil.
4. Single supply source.
5. Low cost.

Disadvantages of this method include:
1. High voltage requirement for the switching element.
2. High system losses and electrical noise.

Another version of Method #1 includes a flywheel diode to absorb the back EMF and discharge the current back into the coil. This method is illustrated in FIGS. 11a and 11b. This is generally the same circuitry as version 1 of Method #1 with the exception that a flywheel diode 151 has been added across the coil. In operation, as the switch 120 opens, the voltage across the coil is reversed. The energy is dissipated through the diode 151 back to the supply.

The diode 151 clamps the energy from coil magnetizing inductance. The switching element 120 does not have to dissipate the energy stored in system during the off time nor does the design require a resistive snubber to dispose of the energy. The other advantage of this approach is reduced system noise and losses, because it effectively clamps the ringing normally associated with the release of the inductive energy.

The main disadvantage of this method is that the current is flowing in the coil 52 even when the switch 120 is open. This constant flow of current in one direction magnetizes the armature 66. This armature magnetization effect causes the armature 66 to be attracted to the core 54 of the coil 52 and not be able to return to its original position and therefore reducing the effective vibration of the system. In addition, it significantly distorts the symmetry of the operation, since the coil 52 is pulling for a significantly longer time than it is releasing. This significantly reduces the movement of the vibrator pan 56.

To overcome the problem, it is common to increase the current to the coil 52, which causes the armature 66, to become magnetically saturated and therefore be less responsive to the higher magnetic force produced by the higher current flowing in the coil 52.

The saturation of the armature 66 is directly related to its material (it is best to use laminated soft iron to prevent low saturation) and the one directional magnetic field of the coil 52. In some applications where it is desirable to increase the vibration of the system, the current is increase to the point that it causes the coil 52 to over-heat and eventually burn out. This method requires higher energy for a given displacement.

The advantages of this system include:
1. Reduced system electrical losses and noise.
2. The voltage stress on the switching element equal to the supply voltage.
3. It requires a single supply source.
4. Current flowing through the switch flows through the vibrator coil.
5. Simple drive referenced to ground.
6. Low cost.

Disadvantages include:
1. Current never stops flowing in the coil at high speed.
2. Armature magnetizing saturation minimizes the armature vibration.
3. High power requirement for a given displacement due to the armature saturation Method #2 is generally referred to as a sourcing method and is seldom used alone since the switch is referenced to the supply voltage rather than the ground and therefore, it requires a boot strap circuit to drive the high side switch. Other characteristics are similar to the low side single supply switching. This configuration is illustrated in FIGS. 12a and 12b. The waveforms are virtually identical to those of Method #1 both with and without the flywheel diode, and will not be further discussed. The advantages and disadvantages are identical to those of Method #1. Since there are no significant improvements, other means have been sought to resolve the shortcomings.

Method #3 illustrated in FIGS. 13a and 13b is based on a Two-Switch Topology with a single power supply. The circuit consists of two switching elements one high side 120 and one low side 121 and two flywheel diodes 151 and 153 with the vibrator coil 52 connected in series as illustrated in FIG. 13a. In this configuration, both switches 120, 121 operate together either both will be ON or both will be OFF according to the drive signal 128. When both switches 120, 121 are closed, the power is delivered to the coil 52. As the switches are opened, the two diodes 153, 151 clamp the voltage to ground 124 and supply +VS 126. At this time, each switch has a turn off voltage stress equal to the supply voltage. While it is an improvement to get the coil 52 out of saturation faster, it still has its drawbacks in passively dissipating the flux field in the coil 52.

The advantages of this method include:
1. Voltage stress for each switch is equal to the supply voltage.
2. Reduced system electrical losses and noise.
3. Choosing two lower voltage transistors in series can have a combined lower ON resistance than a single higher voltage switch. This combination reduces the system electrical loss across the switches.
4. Requires a single supply source.
5. Current flowing through each switch flows through the vibrator coil.

The Disadvantages include:
1. Requires additional transistor switch and flywheel diode.
2. Does not rectify the problem associated with the armature magnetizing saturation.
3. Requires higher energy for a given displacement due to the armature saturation.

Method #4 illustrated in FIG. 14 is a Full Bridge Four-Switch circuit using a single supply. This is simply a multiple offshoot of Method #3. This is the most popular method of driving a motor with a single supply when reversing of the direction is required. This method can easily be used for driving the linear vibrator coils 52. FIG. 14 illustrates the application. Since the waveforms are virtually the same as method #3, the waveforms will not be discussed here.

When switches 120 and 120a are closed, the current flows through switch 120, the coil 52 and switch 120a. As the switches 120 and 120a open, the system's stored energy is clamped by the clamping diodes back to the supply voltage. When switches 121 and 121a are closed, the current flows through switch 121, the coil and switch 121a. As the switches 121 and 121a open, the system's stored energy is clamped by the clamping diodes to the supply voltage. While this method has significant power dissipation advantages over previous methods, the costs involved are significant disadvantages to the implementation of this circuitry in commercial applications.

Advantages to this circuitry include:
1. Voltage stress for each switch is equal to the supply voltage.
2. Reduced system losses and electrical noise.
3. Choosing two lower voltage transistors in series can have a combined lower ON resistance than a single higher voltage switch. This combination reduces the system electrical loss across the switches.
4. Requires a single supply source.
5. Low power requirement for a given displacement.
6. Alternating current prevents armature saturation and the average system current less.

Disadvantages:
1. Requires additional transistors and flywheel diodes.
2. Higher cost. (Components and board space)

The discussion of Method #5 involves many of the claims for uniqueness for this invention and will be delayed until the invention is disclosed.

In order to achieve optimum performance from the vibrator which gives a maximum amount of amplitude for a minimum amount of power, it is necessary to tune the vibrator which seeks to achieve a mechanical resonant point that is consistent with the drive frequency. At this point, the vibrator will achieve maximum displacement with minimum applied power. Heretofore, tuning the vibrator has been typically done in a static condition without product. This tuning process involved modifying the spring constant of flexures 60 and 62 until optimum amplitude was achieved with minimum power. When the frequency of the operation was determined by the line frequency (50 or 60 HZ) and was a fixed entity, the amplitude and resonance were adjusted by the changes in flexures 60 and 62.

Once tuned, such vibrators have been assumed to be in an optimum condition for efficient operation. Unfortunately, this is generally not the case, since the mass of the system changes as the product level varies in the pan. This forces the system running at constant frequency into various levels of detuning depending on the level of product in the pan 56. This condition cannot easily be corrected during normal operation in existing systems, and as a result, the coils 52 begin to overheat and eventually fail as a result of the excess energy required to keep the product moving at the desired rate.

In some prior vibrators, the frequency could be altered and tuning thereof was manually accomplished in two steps, a Coarse Tuning to find the approximate frequency of vibration, followed by a Fine Tuning to find the exact frequency of oscillation. This manual tuning involved finding a set of flexures 68 and 62 which would provide resonance within the range of adjustment of frequency, and then altering the frequency to achieve resonance.

In order to obtain a manual coarse tuning frequency, the following steps were required:
1. Set the gap between the coil and the armature according to the required displacement, the maximum displacement of a vibrator is a function of the air gap and the force produced by the coil. If a 3 mm displacement is required set the gap to 3.5 mm, provided that the coil is adequately rated to produce enough force to attract the armature.
2. Set the amplitude to a moderate value such as 50–60%. This value should be high enough to produce detectable vibration in the feed pan.
3. Set the duration of vibration to continuous with 1000 ms ON and 250 ms OFF times.
4. Start from a higher frequency such as F=65 Hz.
5. Observe the pan displacement and its maximum using the "V" amplitude indicator.
6. Decrement the frequency by one Hz and repeat the step 5.

7. As the frequency is decreased, the displacement will increase. At a certain frequency $F_r$ (resonant frequency), the displacement will be at its maximum. At this point, if the frequency is decreased further, the displacement will also decrease.

When the frequency for the maximum displacement is found $F_r$. The fine frequency can be above or below of Fr by a few tenths of a Hertz. In order to pin point the fine frequency, it is necessary to scan the coarse frequency from one Hertz above to one Hertz below. Therefore, set the oscillating frequency to $F_r+1$ before proceeding with the fine-tuning and follow the steps below:

1. Decrease the frequency by 0.1 Hz from $F_r+1$ to the $F_r-1$ and carefully look for the maximum displacement.
2. During this procedure, it may be necessary to decrease the amplitude to prevent the vibrator from hammering (the armature hitting the coil).
3. Set the vibration frequency to the new fine-tuned natural frequency. Increase the amplitude until the maximum displacement is reached without hammering.
4. Make a note of this new amplitude value. This value is the relative 100% of amplitude for operation of vibrator.

Changes to the natural frequency are made by changing either the mass of the pan or altering the spring constant of the flexures. Once the resonant frequency has been determined, current systems must generally be retuned in a manual mode when the retuning is required.

There were previously no known systems which allow vibrators to be tuned "on the fly" in order to optimize the performance of the product feed with changing product flows, pan build-up, etc. Therefore, there was a need for product delivery systems including electromechanical vibrating conveyors and methods which provided such tuning both statistically and dynamically.

SUMMARY OF THE INVENTION

This invention is designed to be a significant improvement in vibratory feed systems which are currently being used in the industry. Improvements include a computer controlled processor and means to provide a variable frequency PWM drive source to the vibrator. A means is provided for automatically electronically tuning the vibrator both statically and "on the fly" in order to improve the flow of product while reducing the energy required to move said product.

Some of the operational advantages archived by this invention in driving and controlling the vibrators are listed below:

Large displacement at low power;
A minimum of 3.5 mm displacement at maximum amplitude;
Amplitude control from 1 to 100% in 1% increments or better;
Vibration duration control from 1 to 65535 ms in 1 ms increments (but not limited to this timing range);
Adjustable oscillation frequency from 35 to 75 Hz in 0.1 Hz increments (but not limited to this frequency range);
Low electrical noise and high efficiency;
Low cost in terms of material and board space;
Active and passive short circuit protections;
Universal drive for all electromechanical vibrators; and
Share a common power supply.

This invention allows dynamic tuning to compensate for the change of mass due to the addition of product in the pan resulting in more efficient operation with less heat dissipation of the coil.

BRIEF DESCRIPTION OF THE DRAWINGS

Figure 1:
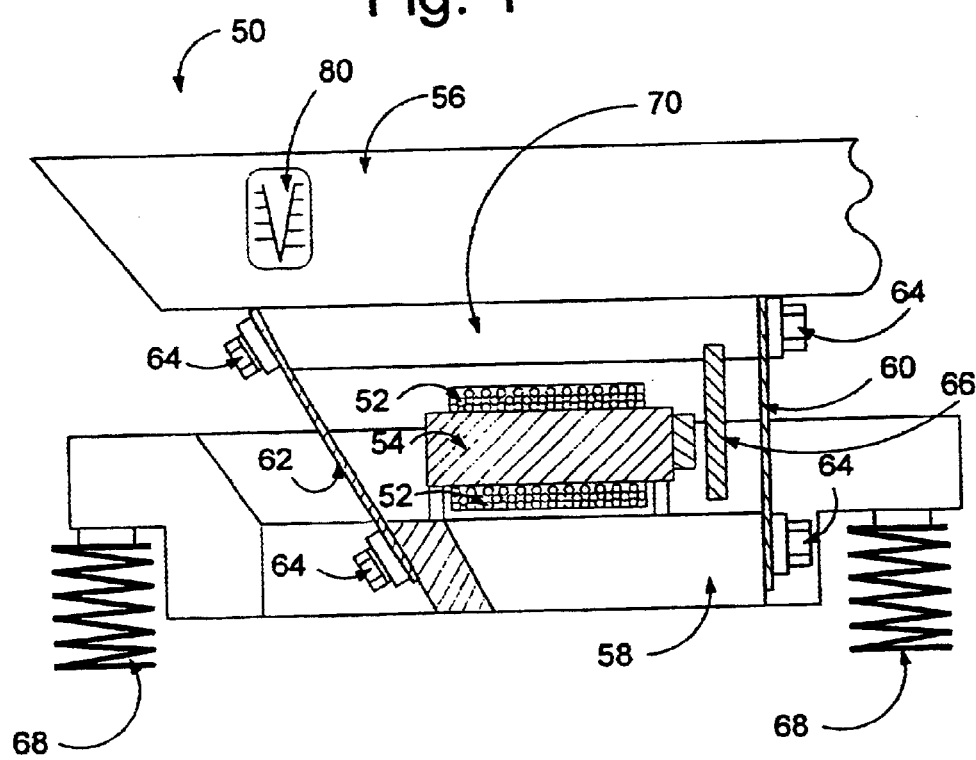
Figure 2:
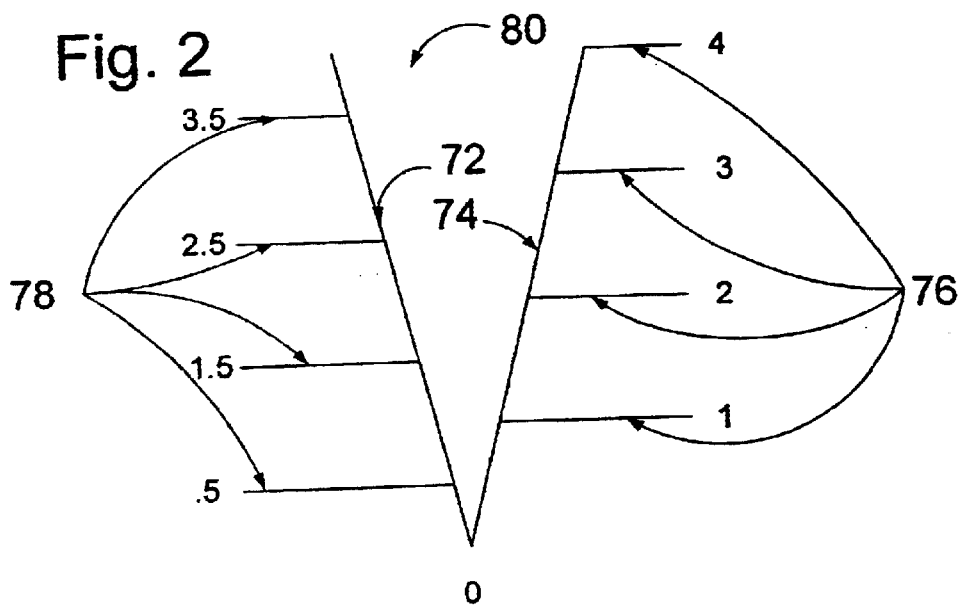
Figure 2A:
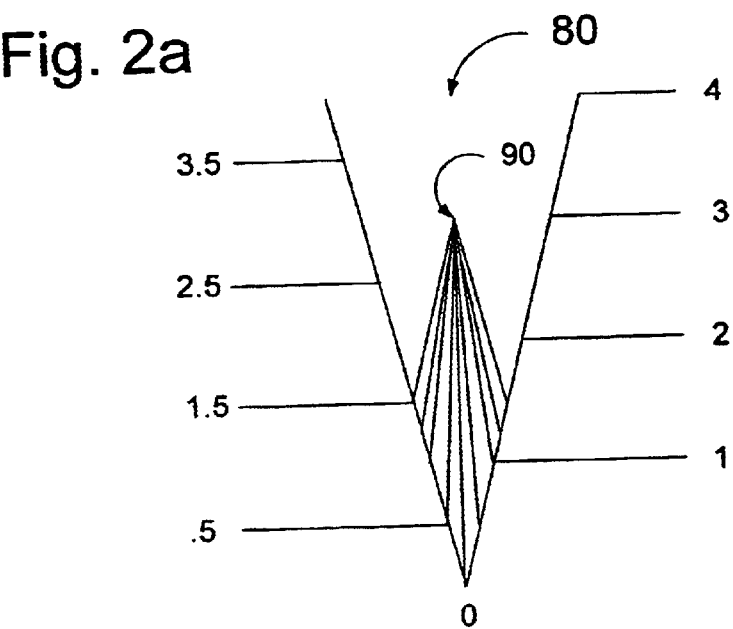
Figure 3A:
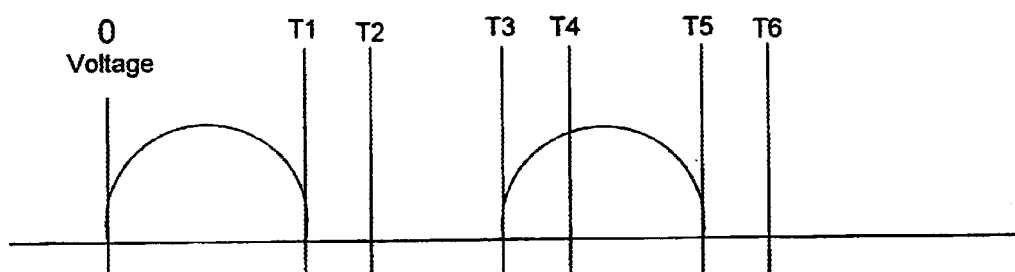
Figure 3B:
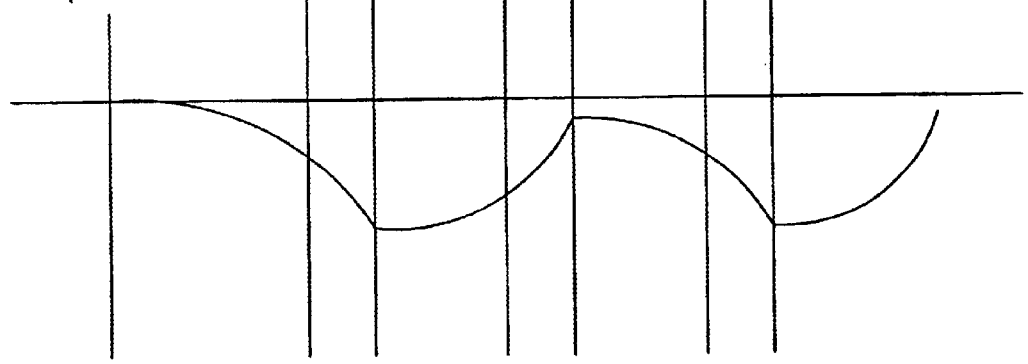
Figure 4A:
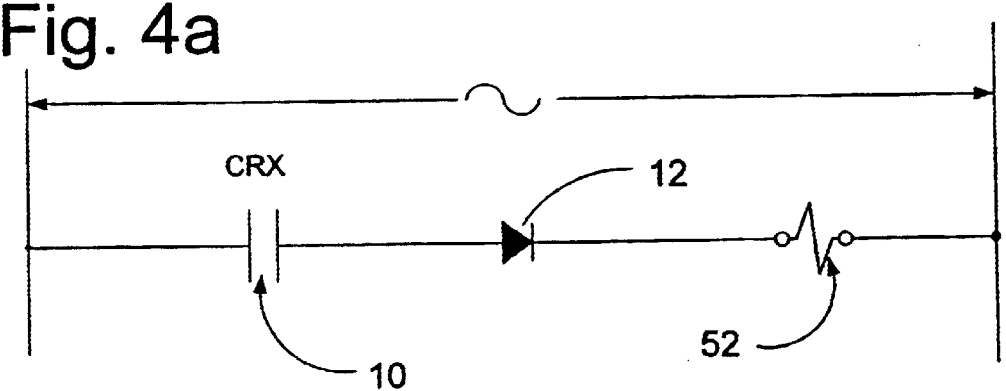
Figure 4B:
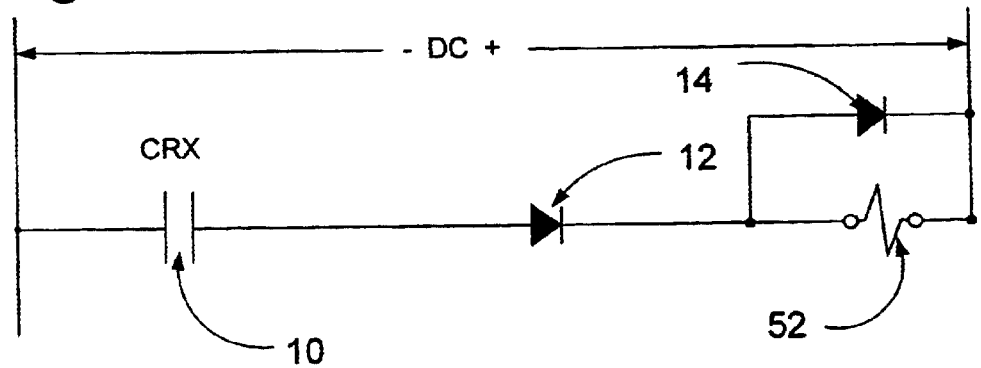
Figure 5A:
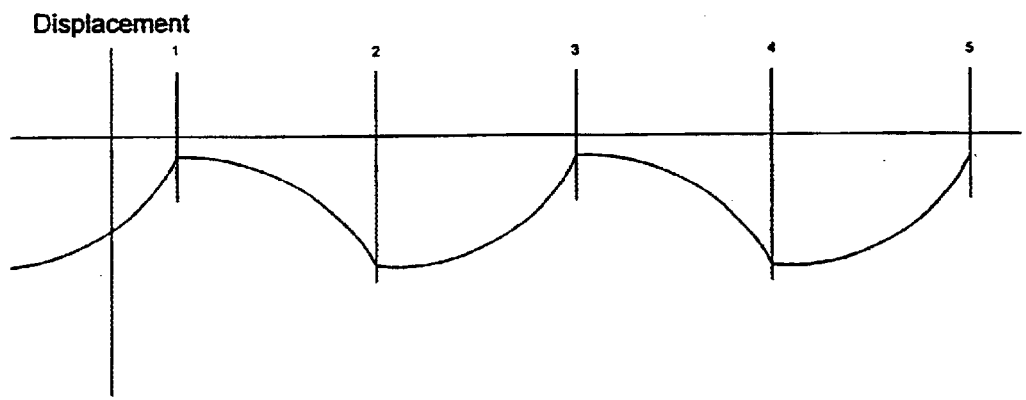
Figure 5B:
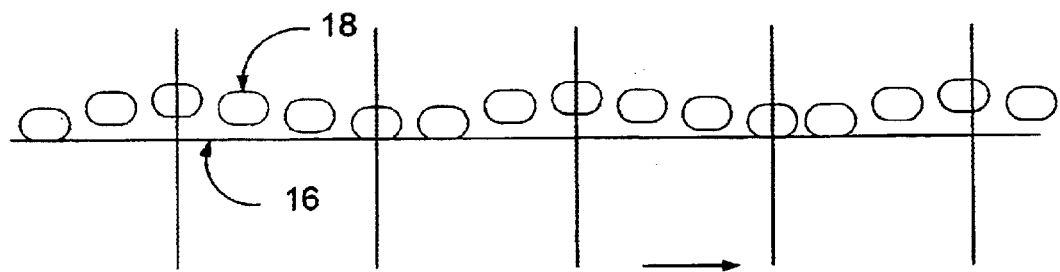
Figure 6:
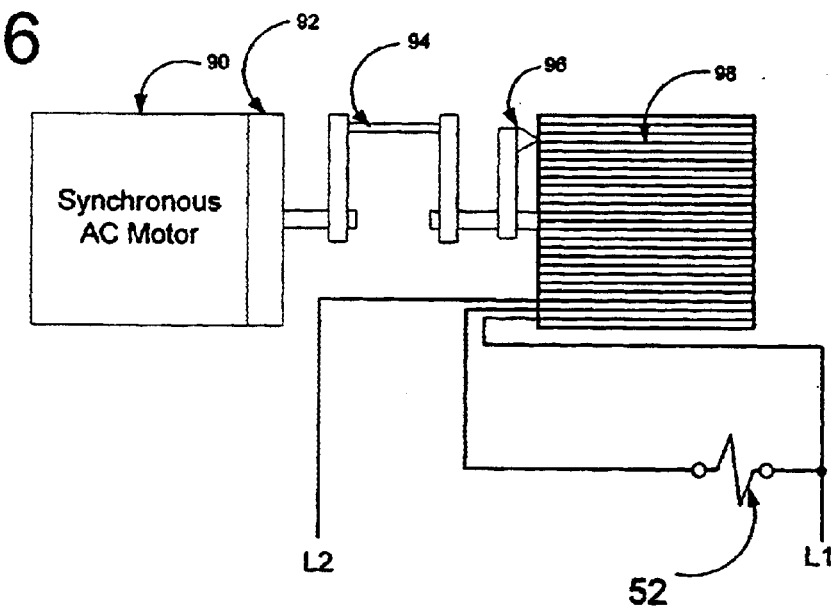
Figure 7:
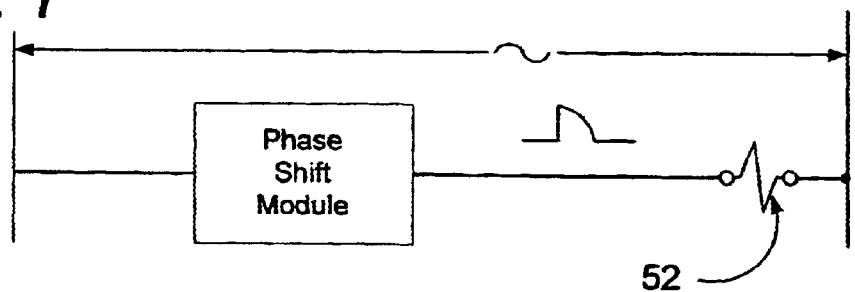
Figure 8:
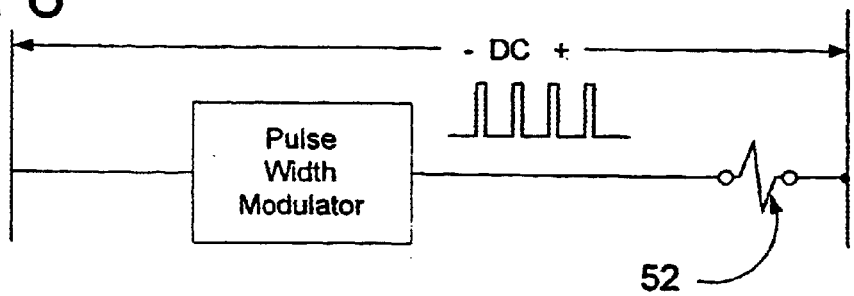
Figure 9:
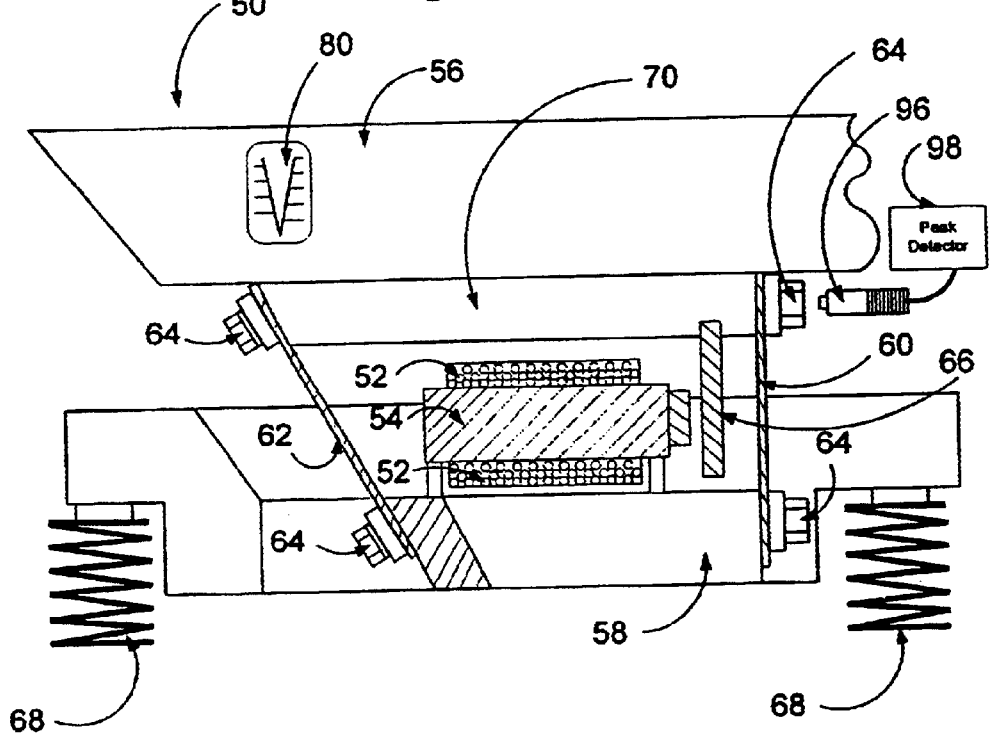
Figure 10A:
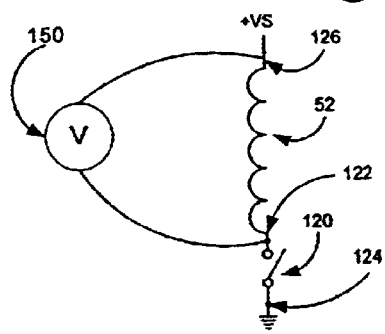
Figure 10B:
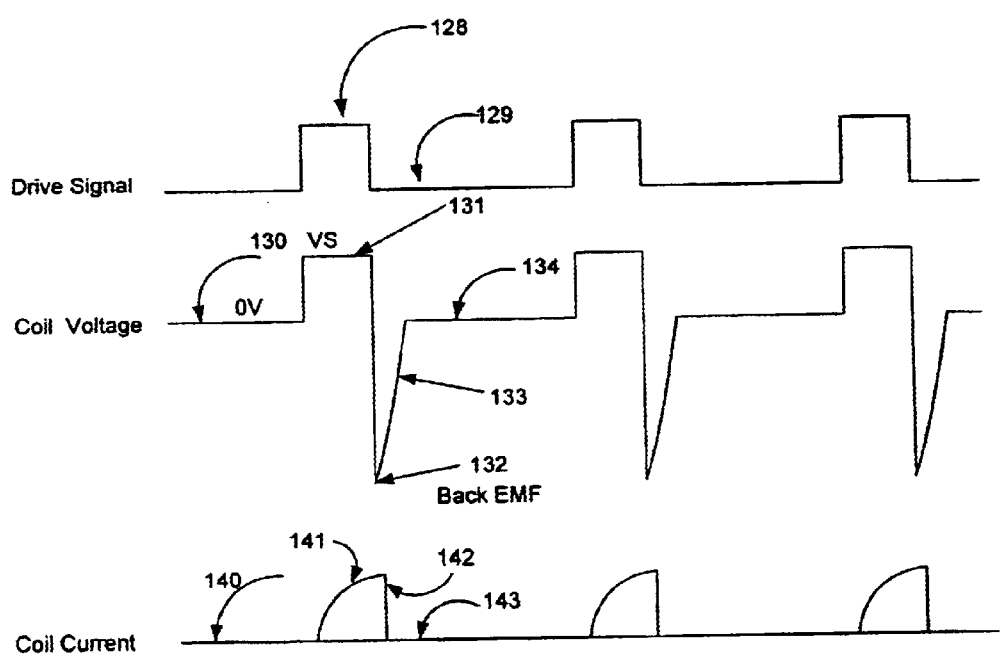
Figure 11A:
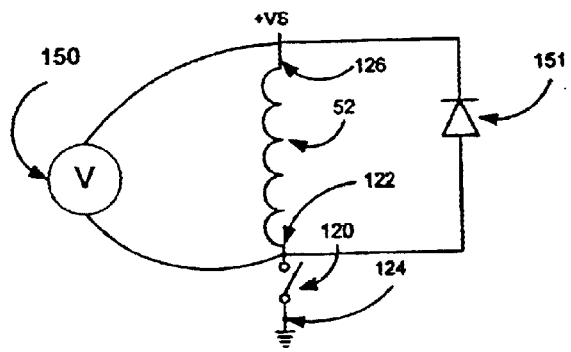
Figure 11B:
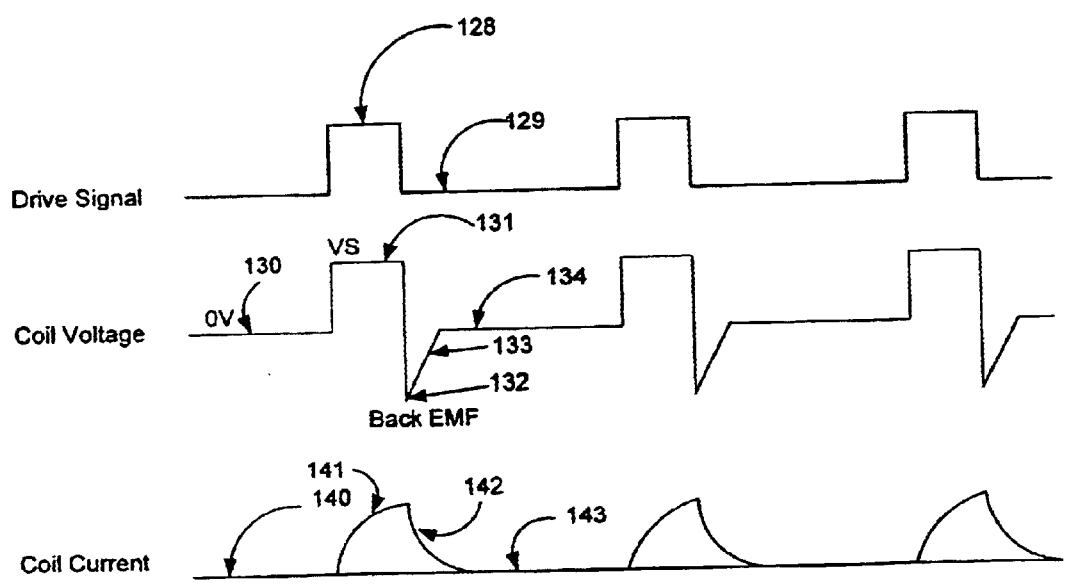
Figure 12A:
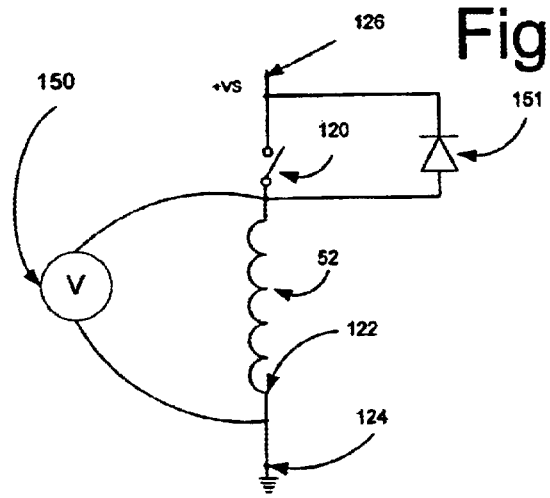
Figure 12B:
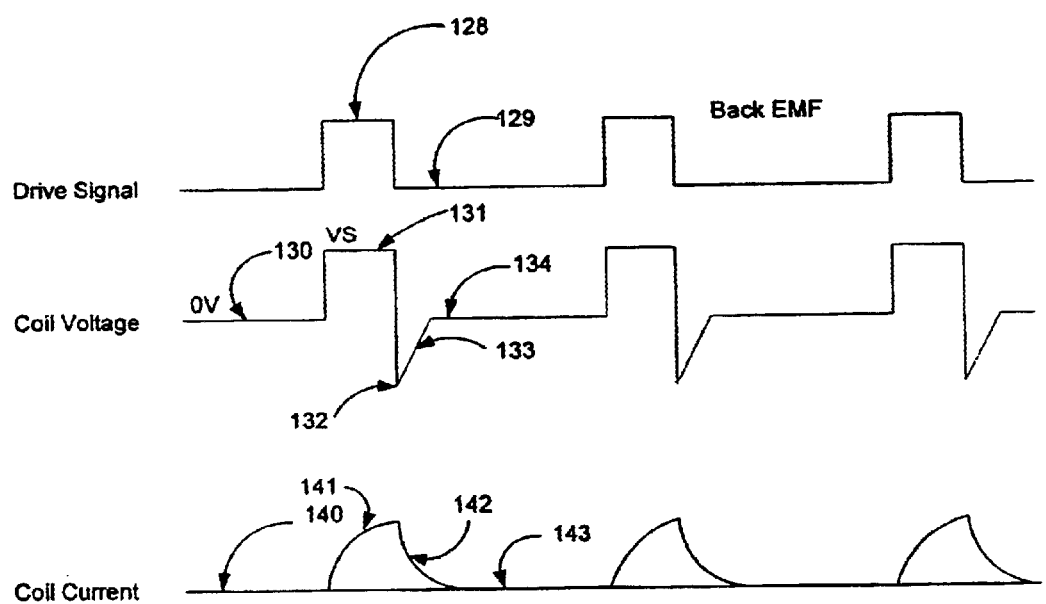
Figure 13A:
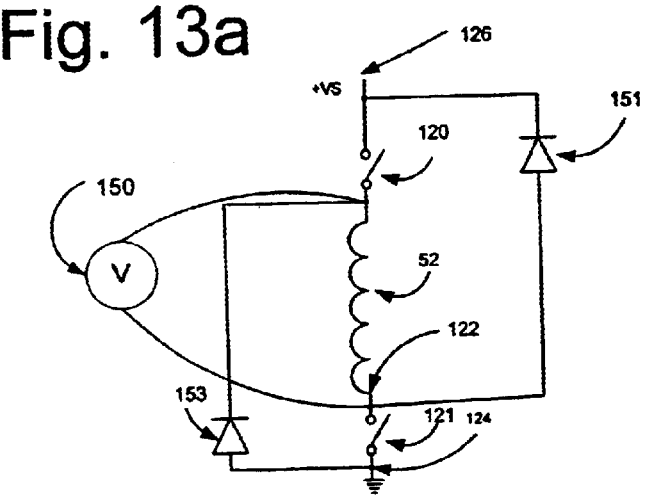
Figure 13B:
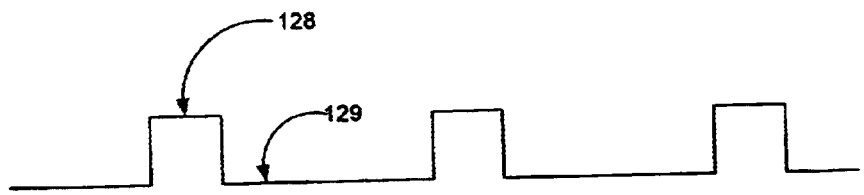
Figure 13B:
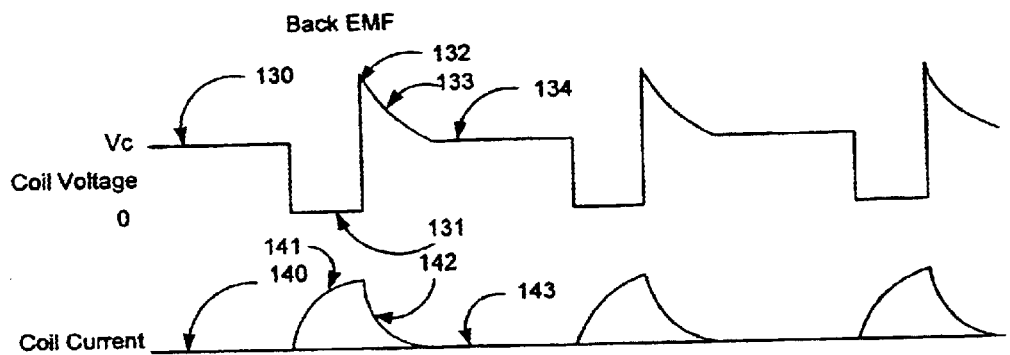
Figure 14:
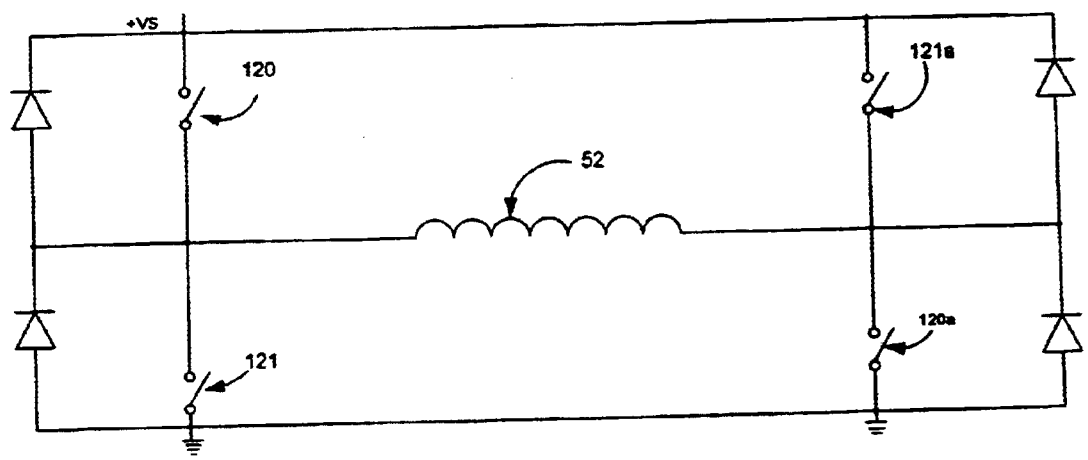
Figure 15A:
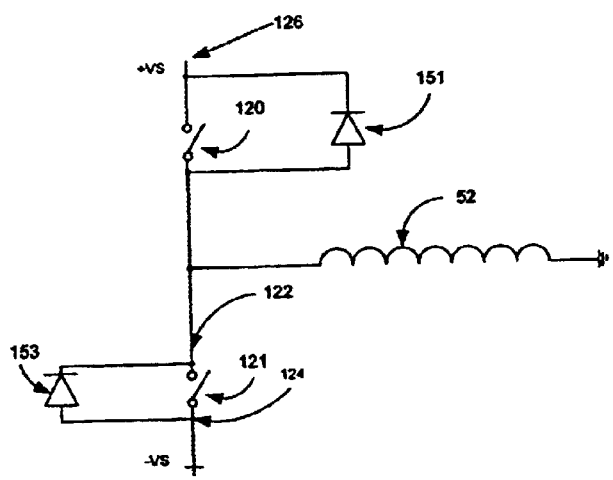
Figure 15B:
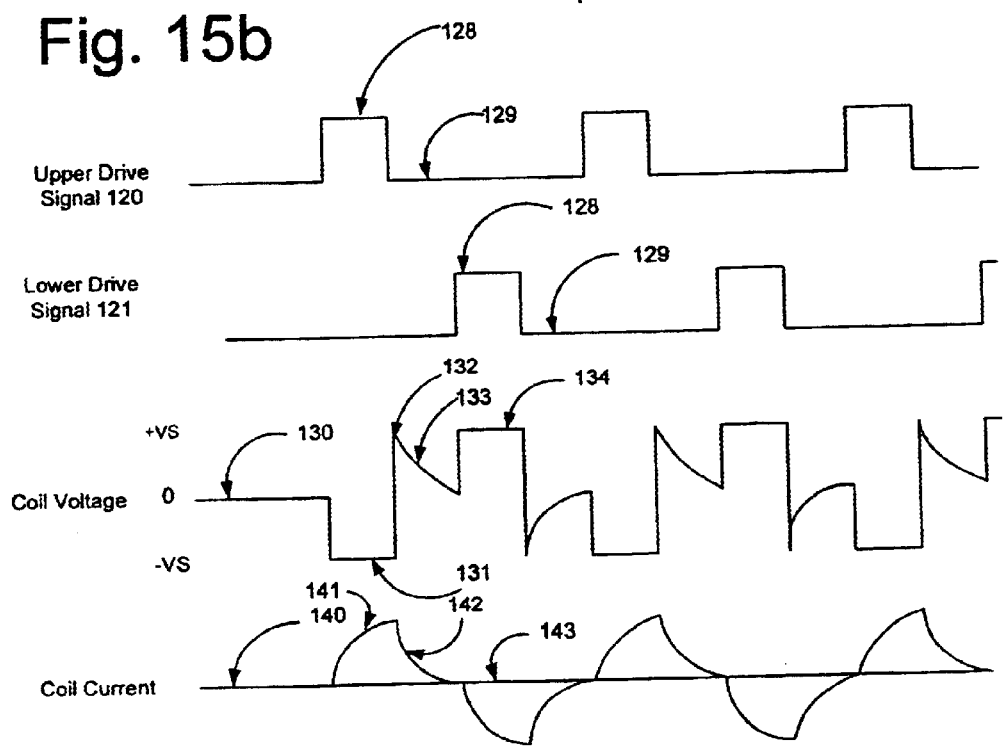
Figure 16A:
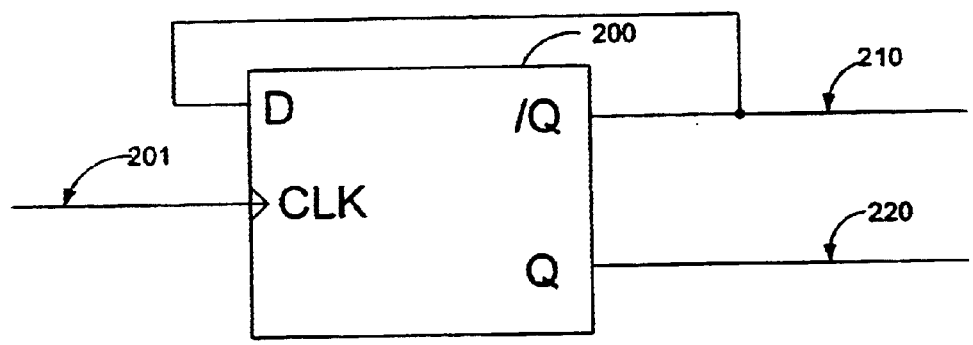
Figure 16B:
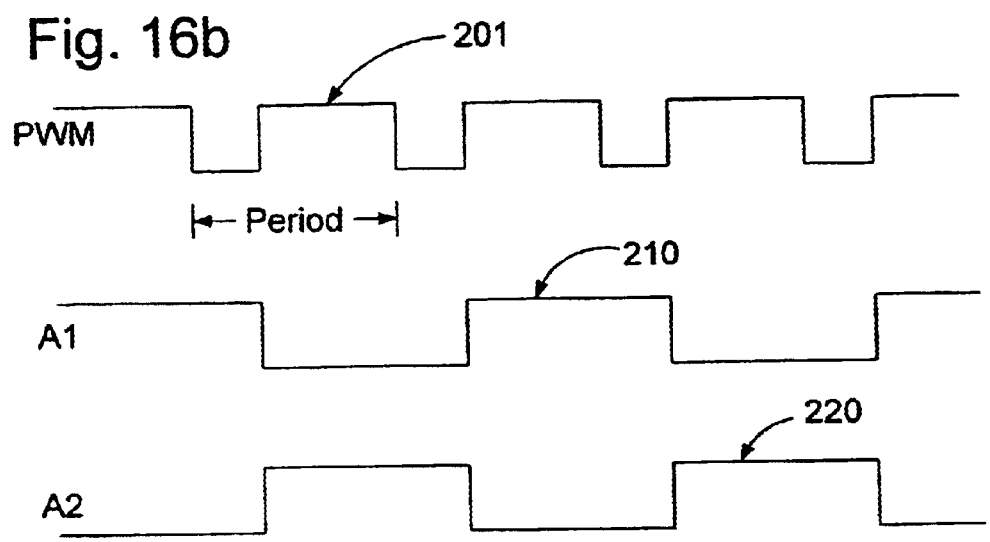
Figure 17A:
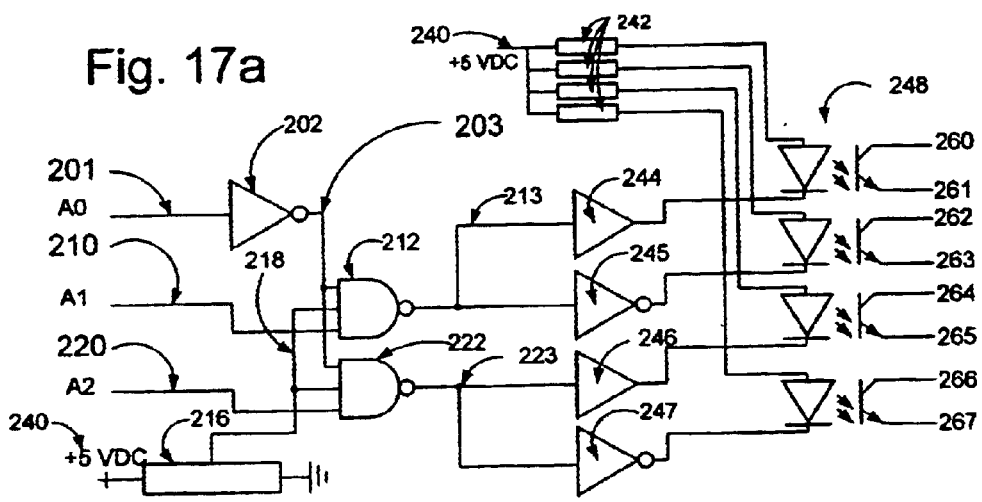
Figure 17B:
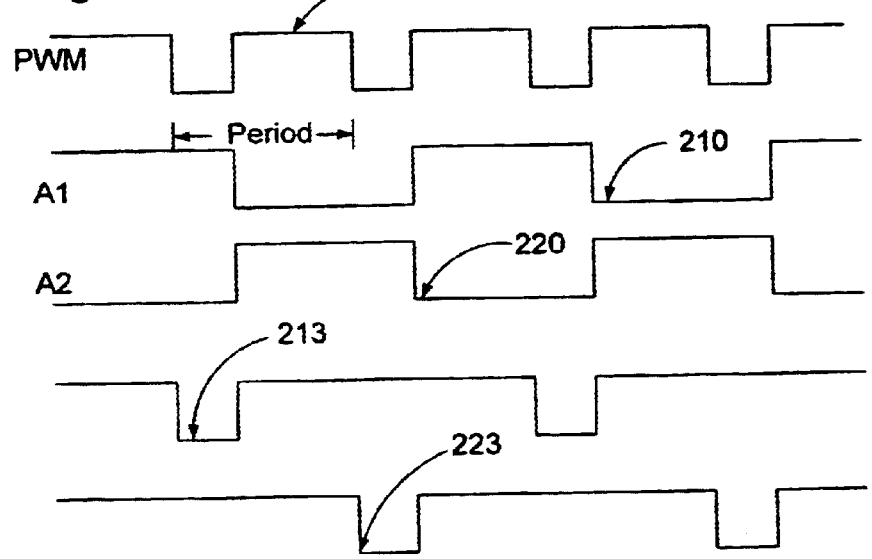
Figure 18:
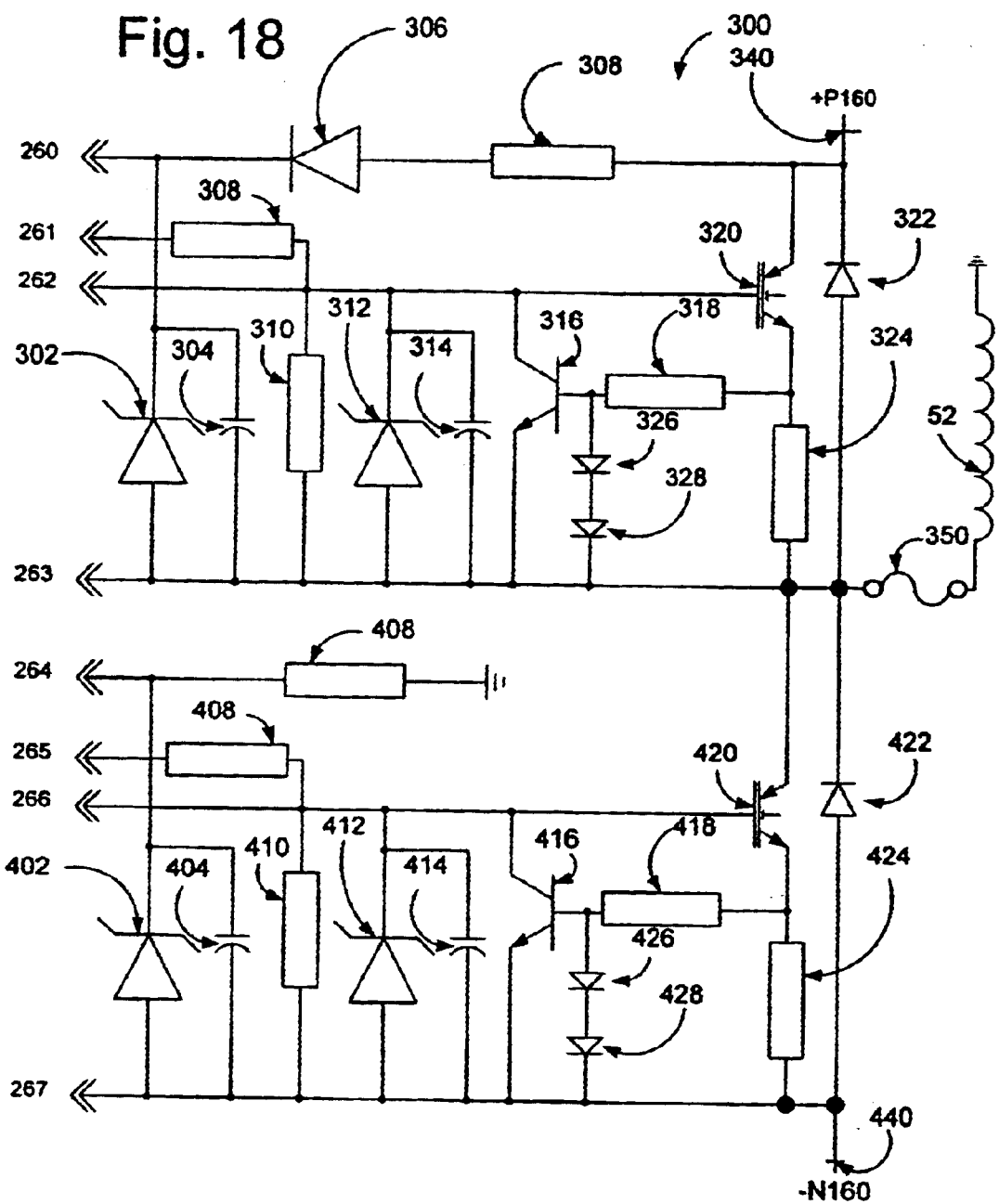

Having thus described the invention in general terms, reference will now be made to the accompanying drawings, which are not necessarily drawn to scale, and wherein:

FIG. 1 is a fragmentary, schematic view of a typical vibrator or vibrating conveyor of the type to which the present invention relates;

FIG. 2 illustrates a typical amplitude indicator used to determine the displacement of the product conveyor in millimeters;

FIG. 2a illustrates the image seen when the vibrator is in operation when the displacement is approximately 3 millimeters;

FIG. 3a illustrates a typical half wave AC supply used to energize the coil of the vibrator;

FIG. 3b illustrates a current waveform typically seen in an inductive load such as the vibrator coil;

FIG. 4a illustrates a typical half wave source for driving the vibrator coil;

FIG. 4b is the circuit of FIG. 4a with a flywheel diode added;

FIG. 5a is the current waveform of the circuit of FIG. 4b;

FIG. 5b is a representation of a single piece of product being transferred down the vibrating product conveying member by the current waveform of FIG. 5a;

FIG. 6 is an amplitude adjustment means used on prior art systems;

FIG. 7 illustrates a phase shift means to control vibrator amplitude in prior art systems;

FIG. 8 illustrates a Pulse Width Modulation control means to control amplitude in prior art systems;

FIG. 9 illustrates a typical vibrator and pan with a proximity sensor to measure the amplitude of the pan during operation for tuning purposes in accordance with the present invention;

FIGS. 10a and 10b illustrate prior art single sinking source and single switch to control the coil with the appropriate waveforms of FIG. 10b;

FIGS. 11a and 11b illustrate the effect of adding a flywheel diode to the means of FIG. 10;

FIGS. 12a and 12b illustrate prior art single sourcing source and single switch with a flywheel diode to control the coil with the appropriate waveforms of FIG. 10b;

FIGS. 13a and 13b illustrate a prior art dual switch configuration with a single supply to improve performance;

FIG. 14 illustrates a prior art four element switch configuration used normally as a reversing circuit for motor drives;

FIGS. 15a and 15b illustrate a bipolar supply used with two switching elements to drive the coil in accordance with the present invention;

FIGS. 16a and 16b illustrate the gating circuitry for the switching which prevents a "Shoot Through" phenomena;

FIGS. 17a and 17b illustrate the gate drive circuitry which is optically isolated and designed to prevent the "Shoot Through" phenomena; and FIG. 18 illustrates the power drive circuitry which has line generated drive supply power and incorporates interlocking of the switching elements to prevent "Shoot Through".

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates schematically a typical vibratory conveyor for which the present invention provides a control system. The vibratory conveyor, generally indicated at 50, comprises a coil 52 wound on a core 54. Running a current through coil 52 attracts armature plate 66 attached to coil frame 64. This causes a deflection of the spring flexures 60 and 62 moving the vibrator pan or product conveying member 56 back and down due to the orientation of the rear flexure 62. The entire assembly is mounted on springs 68 to allow self aligning isolation between the vibrator 50 and the scale frame (not shown).

When the coil voltage is terminated, the energy stored in the flexures 60 and 62 is released to move the pan 56 and the product contained in the pan 56 to the forward position, thus advancing the product in the pan 56. Following the forward motion, the coil 52 is again energized to bring it back and down to the retracted position for the next delivery cycle.

The rate of movement of product in pan 56 is dependent on the amplitude of the shaking as displayed on indicator 80 as well as the frequency of operation. Ineffective tuning causes excessive heating and limited movement resulting in poor performance.

FIGS. 15a and 15b illustrate a circuit diagram including a bipolar source to drive the coil 52 in the lowest cost configuration and resulting in the most efficient drive source available. This method was previously defined as Method #5 and this method and system are the most economical ways of driving the linear vibrators 50 when several vibrators 50 have to share a common power supply.

A differential supply is used for this system and method so long as the transistors and the coil 52 are rated accordingly. The waveforms of FIG. 15a clearly display the effect of alternating current through the coil 52 and recycling of the energy stored in the system. This alternating current prevents the armature 66 from becoming magnetically saturated and it lowers the average system current to reduce the power dissipation.

This method of drive uses and the system includes two switches 120 and 121 connected in series to a differential supply with the vibrator coil 32 connected to center connection of the two switches 120, 121 and supply ground. The operation of this method and system is identical to a full bridge drive operation with the exception of fewer parts.

When the upper switch 120 is closed, the current flows from the positive supply +VA 126 through the switch 120 to the coil 52 to the supply ground 124. As soon as the upper switch 120 opens, the system's stored energy is returned back to the negative supply through the lower flywheel diode 153.

When the lower switch 121 is closed, the current flows from the ground 124 through the coil 52 and the lower switch 121 to the negative supply 160. As soon as the lower switch 121 opens, the system's stored energy is returned back to the positive supply through the upper flywheel diode 151.

This system has significant advantages over the previously described drive schemes. The advantages include:

Voltage stress for each switch is equal to the supply voltage;

Reduced system electrical loss and noise;

Low power requirement for a given displacement;

Alternating current prevents armature saturation; and

Fewer components and reduced board space.

While the advantages are significant particularly in light of the component content when multiple systems are utilized in a common scale system, certain disadvantages are:

Requires a differential supply; and

Requires a bootstrap circuit to turn the upper transistor on.

In addition to these disadvantages, it can be seen that if both switches 120 and 121 were to be ON simultaneously, it would provide a dead short between the bipolar power supplies. This is known as the "Shoot-Through Phenomena". This is a phenomena associated with the full bridge or half bridge drive methods. The drive section must be designed properly for these methods to prevent the switches 120, 121 in series from turning on simultaneously. If a shoot-through occurs as the result of both switches 120, 121 being turned ON simultaneously, the circuit sees a low resistance pass from one side of the supply to other side and the power supply capacitor (not shown) is discharged through this low resistance pass destroying the switches 120, 121. In order to prevent this problem and still allow an extremely cost effective drive system which operates with maximum efficiency and reliability, this circuitry includes numerous means for preventing "shoot through" which makes this a very unique design.

Since this method and system uses two switches 120, 121, the PWM signal must be processed to generate two pulses one for each switch. There must be assurance that the two signals will never occur simultaneously. With reference to FIG. 16a, to prevent this, the PWM signal 201 is fed to the CLK input of a D-Type FLIP-FLOP (FF) 200. Here, the /Q output 210 is fed into the D input such that each time the clock signal 201 transitions from LOW to HIGH, the outputs 210 and 220 will toggle. Therefore, the FF produces two square waves at output points 210 and 220 at half the frequency of the input signal 201. The schematic of the FF for one channel is illustrated in FIG. 16 and the waveforms associated with it are shown in FIG. 16b. This circuitry assures the gating to the switches 120, 121 of FIG. 15a will never allow both switches to be ON simultaneously causing a "Shoot Through" phenomena for the gating circuitry.

In order to separate the ON signals for the upper and lower switches 120, 121, these signals are fed to a logic circuit for signal conditioning as illustrated in FIG. 17a. This diagram illustrates the logic using a traditional NAND gate for simplicity, but typically a PLD (Programmable Logic Device) may be used to reduce the package count on the board.

In this circuit, the PWM signal 201 is fed into an inverter 202. The output of this inverter 202 is shown as signal line 203 and is fed into one of three inputs of NAND gates 212 and 222. The second input of the NAND gate is the enable signal 210 or 220 derived from the previous circuit. Looking specifically at gate 212, when signals 203 and 210 AND 218 are all HIGH, line 213 will be LOW. Line 213 is fed into a non inverting driver 244 and an inverting driver 245. These signals are used to drive two optical isolators shown generally as 248. The diodes are connected to current limiting resistors 242, which are connected to the positive logic supply 240. In this way, when the signal to the diode is LOW, the diode and transistor will be ON and when the signal to the diode is HIGH, the diode and thus the transistor will be OFF. Two signals are generated for each power switching transistor 320 and 420, and the logic and requirements for these signals will be explained in the next section.

The signal timing is illustrated in FIG. 17a. The common signal 213 being fed into an non inverting driver 244 and an inverting driver 245 insure again there will be no dual ON states which can be detrimental to the operation of the system. Gate 222 functions identically to 212 to produce the second gating signal 223 which is fed to the non inverting driver 246 and inverting driver 247 in exactly the same manner. In order to protect the logic side from the high voltage side of the drive, opto-isolators are used to activate and deactivate the switches. One opto-isolator is used to turn the upper switch ON via lines 260 and 261 while the lower switch is disabled by another opto-isolator via lines 262 and 263. This situation reverses for the lower switch when lines 264 and 265 are used to turn the switch ON and the inhibit lines are derived from lines 266 and 267.

It is also desirable to disable the switches at power-up to avoid accidental shoot-through. The NAND gates 212 and 222 drive the line drivers 244, 245, 246 and 247 which are used to turn the Opto-Isolators on and off. 216 is a voltage detector and its output stays LOW as long as the logic supply voltage 240 is less than 4.85V. The output enable 218 of 216 is connected to an input of the NAND gates 212 and 222, which disables the gates 212 and 222 whenever the voltage is less than 4.85 volts. When the voltage exceeds 4.85 volts, gates 212 and 222 are enabled and operation can begin. Therefore, 212 and 222 are disabled (High Impedance output) until the logic supply voltage has stabilized at 5 volts or anytime this voltage drops below 4.85 volts during normal operation.

The schematic diagram of FIG. 18 shows the power drive section for one vibrator, the upper and lower switches 120, 121, and their associated components. The upper section (reference characters 3XX) and the lower section (reference characters 4XX) are symmetrical, and the description will only be primarily directed to the top section with alternative references in parentheses to the lower section. In order to provide a power source for the clamping and gating drive circuitry, a simple zener diode supply is sourced from the line 340 (or line 440). A current limiting resistor 308 (408) is used with a diode 306 to charge capacitor 304 (404). This voltage is regulated by zener diode 302 (402) to provide 15 VDC at 260. This provides the gating voltage the switch 320 (420).

The collector of upper switch 320 is connected to the P160 (positive supply voltage) 340, its emitter to a current sense resistor 324 and to the collector of lower switch 420. The emitter of the lower switch is connected through a current sense resistor 424 to the N160 (negative supply voltage) 440. The center connection of the two switches is connected to the vibrator coil 52 through a fuse 350. The other end of coil 52 is connected to earth ground.

Resistor 308, diode 306, zener diode 302 and capacitor 304 form a bootstrap 15 VDC supply for the upper switch 320. When the upper switch 320 needs to turn on, 260 is shorted to 261 by the opto-isolator to supply the gate of the upper switch 320 with the 15 VDC regulated by the zener diode 302 at 260. At the same time, 266 and 267 are shorted too to disable the lower switch 420 from coming ON accidentally by the EMI generated from the upper switch 320 switching the current ON to the coil 52. This precaution is necessary since the gate of IGBT 320 and 420 have a very high input impedance. This high input impedance is sensitive to any EMI that is generated by other switches turning the coil 52 on/off at a high di/dt. The lower switch 420 works identical to the upper switch with the exception that it does not need the bootstrapping diode since its gate is referenced to the negative supply voltage 440, which is connected to its emitter as well.

In order to protect the IGBTs 320 and 420 and the vibrator coil 52, an active short circuit current protection has been provided for each switch. The NPN transistors 316 and 416 with their associated components are used for this purpose. The short circuit current is equal to the $0.7/R_L$ (current limit resistors 324 and 424). i.e. for the above circuit, the short circuit current is set to 7A. When this condition exists NPN transistors 316 or 416 will turn ON thus cutting off the gate voltage to IGBT 320 or 420 and thus turning OFF 320 or 420 thus protecting the IGBT 320 or 420.

When the top switch 320 is on, the current flows through the switch 320, sense resistor 324, fuse 350 and the vibrator coil to ground. At this time, the lower switch 420 is OFF, as soon as the upper switch turns off, the stored system energy is returned to the negative supply through the lower flywheel diode 422. This situation reverses when the lower switch 420 is ON, but the analysis is the same.

The disadvantages of manual tuning have already been outlined as being difficult and tedious. Each vibrator must be tuned individually. Usually, the controls are far away from the actual vibrators and therefore, it requires two people to do the tuning. It can also be erroneous mainly due to human factor involved in the procedure.

Therefore, it is desirable to be able to tune the vibrators accurately and automatically in a short period and more importantly, the possibility of "on the fly" tuning can be achieved with this circuitry allowing the control system to compensate for variations in product loading in the pans. Tuning the vibrators automatically, requires some means for of measuring the vibration of the feed pan.

One version of the dynamic vibrator tuning invention is illustrated in FIG. 9. In this drawing, a linear inductive proximity sensor 96 is used as the measuring device. It is mounted to detect the displacement of the feed pan 56 as measured from a reference point on the pan 64 to the sensor 96.

The analog signal from this sensor 96 is proportional to the displacement of vibrator armature 66. Many types of sensors can be used to produce the proportional feedback. The feed back signal from the sensor is connected to an Analog to Digital Converter coupled with a peak detector to be read by computer. The sensor 96 outputs a signal which is proportional to the displacement of the pan from the sensor.

The preferred tuning procedure involves two phases, coarse and fine. The coarse tuning is accomplished first and the fine tuning is achieved after the coarse frequency value is established. In this process, there is no change in flexures, but only in frequency. As a result, the resonance with the flexures must be within the range of the frequency adjustment of the system. In order to tune the vibrator in a coarse mode is to change the frequency and look for a minimum feed back value. The process is defined as follows:

1. Fix the amplitude to a preprogrammed or production adjusted value.
2. Change the frequency from 65 to 35 Hz in decrements of one Hertz. It is important to note that, the frequency range of vibration is not limited to 65 to 35 Hz and any range of frequency can be used. This range was selected here since the vibrator used for the test had a frequency range of 65–35 Hz.
3. Record the feed back values.
4. At the end of frequency range, find the frequency for the peak value of the feed back.

5. The frequency obtained would be the coarse tuning frequency $F_{CT}$ HZ.

6. Save the $F_{CT}$ value with the program parameters.

This process can be achieved either manually or automatically. Once determined, the value is stored by the computer for future reference and stored with the program parameters for the particular product being run at the time.

After the completion of the coarse tuning, a fine-tuning of the vibrator as outlined in the following steps:

1. Set the vibrating frequency to the coarse frequency plus one.
2. Decrement the frequency from the $F_{CT}+1$ to $F_{CT}-1$ in decrement step of 0.1 Hz.
3. Record the feed back values.
4. At the end of frequency range, find the frequency for the peak feed back value.
5. The frequency obtained would be the fine tuning frequency $F_{FT}$ HZ.
6. Save the $F_{FT}$ value with the program parameters.

When the fine tuning frequency is found, the program does an amplitude optimization as follows:

1. Set the vibrating frequency to the $F_{FT}$ HZ.
2. Increment or decrement the amplitude in steps of 1% to maximize the displacement without hammering.
3. Save the amplitude setting with the program parameters.

Feedback can also be detected by the back emf of the vibratory device coil 52. This approach requires more involved circuit design.

The auto tuning eliminates the tedious and erroneous task of manual tuning. If the feed-back sensor is mounted to the coil assembly, the exact gap between the armature 66 and the coil 52 can be measured automatically at any time. This is possible since the armature distance with respect to the coil 52 is always constant and to adjust its gap, the coil assembly is moved forward or backward.

This allows easy monitoring of the air gap for trouble shooting or compensation to optimize the vibration system. In addition, variations in sensor placement from one vibrator to another are not important, since each vibrator is treated as a separate entity.

Auto tune is not limited to off line duty. The important aspect of this invention is the ability of this system to monitor and adjust the vibrators while under load to have a more controlled product feed system.

Auto feed control is a feature of scale that uses the product weight from the weigh bucket to alter the amplitude of the vibration in order to bring the bucket target weight to as close as possible to a predetermined value. The understanding is that not only is amplitude changed but the vibration duration could also be changed.

Changing either duration or amplitude is undesirable, if the duration is changed, this could alter the scale's timing, speed and performance and if the amplitude is changed, the power consumption of the vibrator coil 52 is altered that can result in over heating and damage to the coil 52.

One of the features of this invention is that, the rate of product delivery can be corrected "on the fly" with adjusting the frequency of vibration only. It is a common knowledge that the resonance frequency of a vibratory system moves away and down from its peak as the product is put on the pan (dampening the vibration). By knowing this fact, it is necessary to monitor the vibration displacement and optimize it "on the fly". The following procedure describes the method of correcting the product delivery on the fly when auto feed control feature of scale is selected:

Compare the weight of product in the weigh bucket with the predefined bucket target weight;

If the difference is less than the predefined acceptable delta then decrease the frequency of vibration by one tenth of Hertz;

If the difference is greater than the predefined acceptable delta then increase the frequency of vibration by one tenth of Hertz; and If the difference is within the predefined acceptable delta then take no action.

The product in the weigh bucket should be sampled several time and then use the average weight to alter the frequency of vibration in order to avoid system hunting.

Using this process, the system can be dynamically tuned to optimize vibrator performance both with and without product present. This concept has not been used to date and is the unique aspect of this invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of controlling product flow in a product delivery system including an electro-mechanical vibratory conveyor which includes a product conveying member, comprising vibrating the product conveying member to move products from one position to another position while controlling the vibration of the product conveying member both statically and dynamically wherein the vibration of the product conveying member is controlled by an initial coarse tuning followed by a fine tuning of the resonance frequency and wherein said coarse tuning includes changing the frequency from 65 to 35 hertz in decrements of one hertz while recording feed-back values to determine the frequency of the peak value of the feed-back as a coarse tuned frequency, and saving that coarse tuned frequency as a program parameter.

2. A method of controlling product flow in a product delivery system including an electro-mechanical vibratory Conveyor which includes a product conveying member, comprising vibrating the product conveying member to move products from one position to another position while controlling the vibration of the product conveying member both statically and dynamically wherein the vibration of the product conveying member is controlled by an initial coarse tuning followed by a fine tuning of die resonance frequency and wherein said fine tuning includes setting the vibrating frequency to a coarse frequency plus one hertz, decrementing the coarse frequency plus one hertz to the coarse frequency minus one hertz in small decrements while recording feed-back values to determine the frequency of the peak value of the feed-back as a fine tuned frequency and saving that fine tuned frequency as a program parameter.

3. The method according to claim 2 including optimizing the amplitude by setting the vibrating frequency to the fine tuned frequency, changing the amplitude incrementally or decrementally by small amounts to maximize the displacement of said product conveying member without hammering and saving that amplitude setting as a program parameter.

4. A method of controlling product flow in a product delivery system including an electro-mechanical vibratory conveyor which includes a product conveying member, comprising vibrating the product conveying member to move products from one position to another position while controlling the vibration of the product conveying member both statically and dynamically wherein controlling the vibration of the product conveying member includes sensing the weight of product on the product conveying member, comparing the sensed weight with a predetermined target weight and increasing or decreasing the frequency of vibration by a small amount if the sensed weight is different from the target weight by an amount greater than a permissible delta.

5. The method according to claim 4 wherein the weight of product is sensed several times over a predetermined period of time, an averaged sensed weight is determined and the average sensed weight is compared to the predetermined target weight.

6. The method according to claim 4 wherein the frequency of vibration is increased or decreased by one-tenth of a hertz.

7. A product delivery system comprising an electro-mechanical vibratory conveyor including a product conveying member mounted for vibratory movement, means for vibrating said product conveying member at an amplitude and resource frequency, and means for controlling the vibration of said product conveying member both statically and dynamically to optimize performance of said vibrating means both with and without product on said product conveying member wherein said vibration control means includes means for measuring the displacement of said product conveying member and means for changing the frequency of vibration until maximum displacement of said product conveying member at a fixed amplitude is achieved both without and with product on said product conveying member and wherein said displacement measuring means comprises means for determining back emf of said vibrating means and means for generating a signal proportional to the displacement of said product conveying member based on said back emf.

8. A product delivery system comprising an electro-mechanical vibratory conveyor including a product conveying member mounted for vibratory movement, means for vibrating said product conveying member at an amplitude and resource frequency wherein said vibrating means includes a coil wound on a core operatively associated with an armature attached to said product conveying member, and a bipolar power supply for driving said coil wherein said bipolar power supply includes a pulse width modulated drive circuit including two switches connected in series to a differential power supply with said coil connected to center connection of said two switches and supply ground to provide pulse width modulated differential energy to said coil and discharge paths for the energy stored to the supply to reduce core saturation and improve efficiency and accuracy, and means for controlling the vibration of said product conveying member both statically and dynamically to optimize performance of said vibrating means both with and without product on said product conveying member.

9. A product delivery system according to claim 8 wherein said pulse width modulated drive circuit includes a single flip-flop to insure no direct shorts will occur if both switches are turned on simultaneously.

10. A product delivery system according to claim 8 wherein said pulse width modulated drive circuit utilizes a dual signal to drive said switches which simultaneously turns one switch on and disables the other switch.

11. A product delivery system according to claim 8 wherein said pulse width modulated drive circuit optically isolates switch command signals from high voltage drive signals to said switches.

12. A product delivery system according to claim 8 wherein said bipolar supply includes main power lines and wherein said pulse width modulated drive circuit derives logic voltage to control said switches from said main power lines.

13. A product delivery system according to claim 8 wherein said pulse width modulated drive circuit includes enable gating circuitry and disable gating circuitry on each of said switches to guarantee that both switches are never activated simultaneously.

14. A product delivery system according claim 13 wherein said gating circuitry is disabled until power supplied to both of said switches has reached a minimum level.

15. A product delivery system according to claim 13 wherein said gating circuitry is disabled if the line generated logic supply voltage falls below a preset limit.

16. A product delivery system according to claim 8 wherein said pulse width modulated drive circuit includes means for detecting the current level in said drive circuit and for disabling said switches if the current level exceeds a preset level.

17. A product delivery system comprising an electro-mechanical vibratory conveyor including a product conveying member mounted for vibratory movement, means for vibrating said product conveying member at an amplitude and resource frequency, and means for controlling the vibration of said product conveying member both statically and dynamically to optimize performance of said vibrating means both with and without product on said product conveying member wherein said vibration control means includes means for measuring the displacement of said product conveying member and means for changing the frequency of vibration until maximum displacement of said product conveying member at a fixed amplitude is achieved both without and with product on said product conveying in ember, and wherein said displacement measuring means comprises a non-contact inductive proximity sensor.

* * * * *